United States Patent
Cho et al.

(10) Patent No.: US 8,160,254 B2
(45) Date of Patent: *Apr. 17, 2012

(54) METHOD FOR MANAGING GROUP TRAFFIC ENCRYPTION KEY IN WIRELESS PORTABLE INTERNET SYSTEM

(75) Inventors: Seok-Heon Cho, Iksan (KR); Chul-Sik Yoon, Daejeon (KR)

(73) Assignees: Samsung Electronics Co., Ltd., Suwon-si (KR); Electronics and Telecommunications Research Institute, Daejeon (KR); KT Corporation, Seongnam (KR); SK Telecom Co., Ltd., Seoul (KR); Hanaro Telecom, Inc., Seoul (KR)

( * ) Notice: Subject to any disclaimer, the term of this patent is extended or adjusted under 35 U.S.C. 154(b) by 1162 days.

This patent is subject to a terminal disclaimer.

(21) Appl. No.: 11/921,894

(22) PCT Filed: Jun. 9, 2006

(86) PCT No.: PCT/KR2006/002214
§ 371 (c)(1),
(2), (4) Date: Dec. 10, 2007

(87) PCT Pub. No.: WO2006/132512
PCT Pub. Date: Dec. 14, 2006

(65) Prior Publication Data
US 2009/0235075 A1 Sep. 17, 2009

(30) Foreign Application Priority Data

Jun. 10, 2005 (KR) .......................... 10-2005-0049879
Feb. 10, 2006 (KR) .......................... 10-2006-0012920

(51) Int. Cl.
*H04L 29/06* (2006.01)

(52) U.S. Cl. ........ 380/273; 713/170; 713/153; 380/279; 380/44

(58) Field of Classification Search .................. 713/153, 713/170; 380/273, 277, 44, 279
See application file for complete search history.

(56) References Cited

U.S. PATENT DOCUMENTS

| 5,528,691 | A  | * | 6/1996 | Rosauer et al. ................ 380/273 |
| 7,234,058 | B1 | * | 6/2007 | Baugher et al. ................ 713/163 |
| 7,237,113 | B2 | * | 6/2007 | Szyszko ........................ 713/171 |
| 7,266,687 | B2 | * | 9/2007 | Sowa et al. .................... 713/163 |

(Continued)

FOREIGN PATENT DOCUMENTS

EP 0 952 718 A2 10/1999

(Continued)

OTHER PUBLICATIONS

Supplementary European Search Report dated Dec. 27, 2010 in connection with European Patent Application No. EP 06 76 8815.

(Continued)

*Primary Examiner* — David Garcia Cervetti (57) ABSTRACT

The present invention relates to a method for managing a group traffic encryption key (GTEK) in a wireless portable Internet system. In the method, for higher security of a group traffic service such as a multicast service, a broadcast service, and a multicast-broadcast service (MBS), a base station periodically generates and distributes a GTEK to a subscriber station served with the group traffic service. A lifetime of a group key encryption key (GKEK) used for encrypting a GTEK is set greater than that of the GTEK. That is, the GKEK is updated once while the GTEK is updated several times. According to the present invention, security for the group traffic service is increased while reducing radio resource consumption.

21 Claims, 8 Drawing Sheets

U.S. PATENT DOCUMENTS

| | | | |
|---|---|---|---|
| 7,362,868 B2 * | 4/2008 | Madoukh et al. | 380/277 |
| 7,400,732 B2 * | 7/2008 | Staddon et al. | 380/278 |
| 7,571,469 B2 * | 8/2009 | Hamberg | 726/10 |
| 7,594,262 B2 * | 9/2009 | Hanzlik et al. | 726/15 |
| 7,599,496 B2 * | 10/2009 | Hengeveld et al. | 380/278 |
| 7,827,262 B2 * | 11/2010 | Weis | 709/223 |
| 7,907,733 B2 * | 3/2011 | Cho et al. | 380/273 |
| 7,911,973 B2 * | 3/2011 | Kumazawa et al. | 370/254 |
| 2001/0019614 A1 * | 9/2001 | Madoukh | 380/277 |
| 2002/0071430 A1 * | 6/2002 | Szyszko | 370/389 |
| 2002/0154782 A1 * | 10/2002 | Chow et al. | 380/278 |
| 2003/0126464 A1 | 7/2003 | McDaniel et al. | |
| 2004/0120526 A1 * | 6/2004 | Hamberg | 380/277 |
| 2004/0131187 A1 * | 7/2004 | Takao et al. | 380/255 |
| 2004/0162983 A1 * | 8/2004 | Gotoh et al. | 713/171 |
| 2005/0047598 A1 * | 3/2005 | Kruegel | 380/264 |
| 2005/0047600 A1 * | 3/2005 | Newkirk | 380/278 |
| 2005/0050004 A1 * | 3/2005 | Sheu et al. | 707/1 |
| 2005/0152305 A1 * | 7/2005 | Ji et al. | 370/328 |
| 2005/0220095 A1 * | 10/2005 | Narayanan et al. | 370/389 |
| 2005/0246533 A1 * | 11/2005 | Gentry | 713/170 |
| 2008/0013734 A1 * | 1/2008 | Sowa et al. | 380/278 |
| 2008/0013735 A1 * | 1/2008 | Sowa et al. | 380/278 |
| 2008/0013736 A1 * | 1/2008 | Sowa et al. | 380/278 |
| 2008/0013737 A1 * | 1/2008 | Sowa et al. | 380/278 |
| 2008/0080713 A1 * | 4/2008 | Cho et al. | 380/273 |
| 2009/0019284 A1 * | 1/2009 | Cho et al. | 713/170 |
| 2009/0144551 A1 * | 6/2009 | Belenky | 713/175 |

FOREIGN PATENT DOCUMENTS

| | | |
|---|---|---|
| EP | 1 549 010 A1 | 6/2005 |
| EP | 1 575 210 A1 | 9/2005 |
| KR | 1020030034471 A | 5/2003 |
| KR | 1020050089736 A | 9/2005 |

OTHER PUBLICATIONS

M. Baugher, et al., "Multicast Security (MSEC) Group Key Management Architecture", Network Working Group, Apr. 2005, 38 pages.

L. Duquerroy, et al., "The Flat Multicast Key Exchange protocol", Internet Engineering Task Force, Feb. 2005, 38 pages.

"Access and Terminals (AT); Second Generation Transmission Systems for Interactive Cable Television Services—IP Cable Modems; Part 3: Baseline privacy plus interface specification", ETSI ES 202 488-3 V1.1.1, ETSI Standard, Sep. 2003, 131 pages.

Zhang, Q. et al., "On Rekey Policies for Secure Group Applications", The 12th International Conference on Computer Communications and Networks, Oct. 20-22, 2003; pp. 559-564.

IEEE C802.16-e05/278, "Clarification of GKEK-related Parameters for the MBRA", Broadband Wireless Access Working Group, http://ieee802.org/16; Jun. 8, 2005, 9 pages.

* cited by examiner

FIG. 3

| Attribute | Contents |
|---|---|
| Key Sequence Number | AK Sequence Number |
| SAID | Security Association identifier<br>-GSAID for multicast or broadcast service |
| Counter | A random number generated in an MS |
| CMAC-Digest/HMAC-Digest | Message digest calculated using AK |

FIG. 4

| Attribute | Contents |
|---|---|
| Key Sequence Number | AK Sequence Number |
| SAID | Security Association identifier<br>-GSAID for multicast or broadcast service |
| TEK-Parameters | "Older" generation of key parameters relevant to SAID<br>-GTEK-Parameters for multicast or broadcast service |
| TEK-Parameters | "Newer" generation of key parameters relevant to SAID<br>-GTEK-Parameters for multicast or broadcast service |
| GKEK-Parameters | "Older" generation of GKEK-related parameters for multicast or broadcast service. |
| GKEK-Parameters | "Newer" generation of GKEK-related parameters for multicast or broadcast service. |
| Counter | The same random number included in the PKMv2 Key-Request message |
| CMAC-Digest/HMAC-Digest | Message digest calculated using AK |

FIG. 5

| Attribute | Contents |
|---|---|
| Key Sequence Number | Key Sequence Number |
| GSAID | Group Security Association identifier<br>The GSAID is the SAID for multicast or broadcast service |
| Key Push Modes | Usage code of PKMv2 Group Key Update Command message |
| Key Push Counter | Counter one greater than that of older generation |
| GTEK-Parameters | "Newer" generation of GTEK-related parameters relevant to GSAID<br>The GTEK-Parameters is the TEK-Parameters for multicast or broadcast service |
| GKEK-Parameters | "Newer" generation of GKEK-related parameters for multicast or broadcast service. |
| CMAC-Digest/HMAC-Digest | Message integrity code of this message |

FIG. 6

| Attribute | GKEK update mode | GTEK update mode |
|---|---|---|
| Key Sequence Number | AK Sequence Number | GKEK Sequence Number |
| GSAID | Yes | Yes |
| Key Push Modes | Yes | Yes |
| Key Push Counter | Yes | Yes |
| GTEK-Parameters | No | Yes |
| GKEK-Parameters | Yes | No |
| HMAC/CMAC-Digest | Yes | Yes |

FIG. 7

| Attribute | Contents |
|---|---|
| TEK | TEK, encrypted with the KEK |
|  | GTEK, encrypted with the GKEK |
| Key-Lifetime | TEK Remaining Lifetime |
| Key-Sequence-Number | TEK Sequence Number |
| CBC-IV | CBC Initialization Vector |
| Associated GKEK Sequence Number | Associated GKEK sequence number with this TEK-Parameters |

FIG. 8

| Attribute | Contents |
|---|---|
| GKEK | Group Key Encryption Key, encrypted with KEK derived from AK |
| Key-Lifetime | GKEK's remaining lifetime |
| Key-Sequence-Number | GKEK's sequence number |

METHOD FOR MANAGING GROUP TRAFFIC ENCRYPTION KEY IN WIRELESS PORTABLE INTERNET SYSTEM

CROSS-REFERENCE TO RELATED APPLICATION(S)

The present application is related to International Application No. PCT/KR2006/002214 filed Jun. 9, 2006 entitled "METHOD FOR MANAGING GROUP TRAFFIC ENCRYPTION KEY IN WIRELESS PORTABLE INTERNET SYSTEM" which claims priority to Korean Patent Application No. 10-2005-0049879 filed Jun. 10, 2005 and Korean Patent Application No. 10-2006-0012920 filed Feb. 10, 2006. International Application No. PCT/KR2006/002214 is assigned to the assignees of the present application and is hereby incorporated by reference into the present disclosure as if fully set forth herein. The present application hereby claims priority under 35 U.S.C. §119(a) to International Application No. PCT/KR2006/002214.

TECHNICAL FIELD

The present invention relates to a refreshing method for a traffic encryption key (TEK) in a wireless portable Internet system, and more particularly, it relates to a method for updating a group TEK (GTEK) for one of group traffic services such as a multicast service, a broadcast service, and a multicast broadcast service.

BACKGROUND ART

In a wireless communication system, which is a next-generation communication system, a wireless portable Internet supports mobility for local area data communication such as a conventional wireless local access network (LAN) that uses a fixed access point. Various wireless portable Internet standards have been proposed, and the international standard of the portable Internet has actively progressed on the IEEE 802.16. The IEEE 802.16 supports a metropolitan area network (MAN) representing an information communication network covering the LAN and the wide area network (WAN).

The IEEE 802.16 wireless MAN system defines a traffic data encryption function in order to securely provide various services. The traffic data encryption function has become a basic requirement for service security as well as network stability.

The currently proposed privacy key management version 2 (PKMv2) is a security key update protocol for generating and distributing a traffic encryption key that encrypts traffic data in the IEEE 802.16 wireless MAN system. According to the PKMv2, each traffic encryption key has a limited lifetime and thus must be periodically updated with a new traffic encryption key for security. Accordingly, a subscriber station and a base station share the same traffic encryption key.

It may cause an excessive load increase of a radio signal channel in the IEEE 802.16 wireless MAN system in the case that a method for updating a group traffic encryption key (GTEK) for a multicast service, a broadcast service, or a multicast-broadcast service (MBS) is processed in the same way that the method for updating a traffic encryption key for a unicast service is processed.

In order to solve the above-stated problem, Korean Patent Laid-Open Publication No. 2005-0089736 disclosed two methods for updating a TEK for a multicast service and a broadcast service. According to this prior art, a base station automatically updates a traffic encryption key (TEK) when it is necessary to update a TEK for a multicast service and a broadcast service, and distributes the updated TEK using a broadcasting channel. Particularly, according to the prior art, a group key encryption key (GKEK) used for encrypting a TEK is generated and distributed first and then the TEK is updated, and thus the base station distributes a newer TEK encrypted with the updated GKEK through a broadcasting channel to all subscriber stations.

Therefore, conventionally, when updating a TEK for the multicast service, broadcast service, or MBS, the base station continuously performs an updating process for a TEK that is valid in the next time interval in order to provide seamless and secure services in the multicast service, broadcast service, or MBS. The base station provides the TEK being valid in the next time interval to the subscriber station through a broadcasting channel and therefore the TEK needs to be encrypted, and a GKEK is used as an input key for the encryption of the TEK. Particularly, the lifetime of the TEK and the lifetime of the GKEK are the same, and a key used for encrypting the TEK is a new GKEK which is updated during the valid lifetime of the current TEK and assigned.

However, it is inefficient to transmit a Key Update Command message for the GKEK update mode whenever the base station updates a TEK so as to provide all the subscriber stations served with the multicast service, broadcast service, or MBS with the same GKEK. Particularly, in the case that a service provider intentionally reduces a lifetime of a TEK for enhancing service security, the number of transmissions of the Key Update Command message for the GKEK mode to each subscriber served with the above service increases in proportion to the number of transmissions of the Key Update Command message for the TEK update mode. Resultantly, the processing amount and radio resource consumption become increased for transmission of the Key Update Command message for the GKEK update mode. In other words, in the case of reducing the lifetime of the TEK for increasing service security, the number of TEK updates is more increased within the same amount of time compared to before the reduction of the lifetime of the TEK, and as a result, the number of GKEK updates also increases. This implies that the resource will be more consumed since the number of transmissions of the Key Update Command message for the GKEK update is increased.

Therefore, a method for reducing an amount of radio channel resources used for transmitting the Key Update Command message for the GKEK update mode while increasing security for the service is required.

The above information disclosed in this Background section is only for enhancement of understanding of the background of the invention and therefore it may contain information that does not form the prior art that is already known in this country to a person of ordinary skill in the art.

DISCLOSURE

Technical Problem

The present invention has been made in an effort to provide a method for updating a group traffic key encryption key (GTEK) by efficiently updating a group key encryption key (GKEK) used for encrypting a TEK for a multicast service, a broadcast service, or a multicast-broadcast service (MBS) to thereby increase service security while reducing radio resource consumption in a wireless portable Internet system.

Technical Solution

An exemplary updating method according to an embodiment of the present invention updates a group traffic encryption key (GTEK) in a wireless portable internet system.

The method includes a) determining whether a lifetime of a current group key encryption key (GKEK) used for encrypting a current GTEK expires within a lifetime of the current GTEK; b) when the lifetime of the current GKEK does expire within the lifetime of the current GTEK, generating a next GTEK and a next GKEK to be used for encrypting the next GTEK within the lifetime of the current GTEK, and transmitting the next GTEK and the next GKEK to a subscriber station; and c) when the lifetime of the current GKEK does not expire within the lifetime of the current GTEK, generating a next GTEK within the lifetime of the current GTEK and transmitting the next GTEK to the subscriber station, wherein the next GTEK is encrypted with the current GKEK.

An exemplary updating method according to another embodiment of the present invention updates a GTEK in a wireless portable Internet system. The method includes a) receiving a GTEK request through a key request message from a subscriber station for encrypting a specific group traffic service; b) determining whether a GTEK being used for the specific group traffic service exists; c) in the case that a result of the determination shows that the GTEK being used for encrypting the specific group traffic service does not exist, generating an initial GTEK for encrypting traffic data of the specific group traffic service and an initial GKEK for encrypting the initial GTEK and transmitting a key reply message including the initial GTEK and the initial GKEK to the subscriber station; and d) in the case that a result of the determining shows that the GTEK being used for encrypting the specific group traffic service exists, transmitting a key reply message including the currently used GTEK and the currently used GKEK for encrypting the current GTEK to the subscriber station. A lifetime of the initial GKEK generated in c) is set to be greater than that of the initial GTEK, and a lifetime of the GTEK transmitted to the subscriber station in d) and a lifetime of the GKEK respectively correspond to a remaining lifetime of each key.

In the case that a network node including a group traffic server, a node which requests authentication (Authenticator), or an MBS server generates a GTEK and a GKEK, the network node transmits the GTEK and GKEK to a base station for distribution of the GTEK and GKEK from a base station to subscriber stations, wherein the base station accessing the network node serves the group traffic service to the subscriber stations through a radio channel.

BEST MODE

An exemplary embodiment of the present invention will hereinafter be described in detail with reference to the accompanying drawings.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout this specification and the claims that follow, unless explicitly described to the contrary, the word "comprise/include" or variations such as "comprises/includes" or "comprising/including" will be understood to imply the inclusion of stated elements but not the exclusion of any other elements.

In addition, throughout the specification, the claims, and the accompanying drawings that follow, the word "subscriber station" may be replaced with the word "mobile station (MS)".

Hereinafter, a method for updating group traffic encryption key in a wireless portable Internet system according to an exemplary embodiment of the present invention will be described with reference to the accompanying drawings.

Before providing further detailed description, descriptions of general contents that can be commonly applied throughout exemplary embodiments of the present invention will be provided.

Each encryption key has a lifetime for guaranteeing security of the key. The corresponding encryption key is available only for a period defined by the lifetime. In addition, all the encryption keys must be continuously updated so as to provide secure and seamless traffic services, and in particular, a currently used encryption key must be updated before the lifetime of the key expires.

According to an exemplary embodiment of the present invention, a current group traffic encryption key, a current group key encryption key, the next group traffic encryption key, and the next group key encryption key are respectively defined as follows. The current group traffic encryption key is a key used to encrypt data for group traffic service to be provided to a subscriber station from a base station, and the next group traffic encryption key is a new key used to encrypt the data for the group traffic service that is continuously provided from the base station after a lifetime of the current group traffic encryption key has expired. In addition, a key currently used for encrypting the group traffic encryption key when transmitting the group traffic encryption key to the subscriber that is served with the group traffic services is defined as the current group key encryption key, and a key used for encrypting a newly updated group traffic encryption key to be transmitted to the subscriber station after a lifetime of the current group key encryption key has expired is defined as the next group key encryption key.

In the traffic encryption key updating method according to the exemplary embodiment of the present invention, a traffic encryption key (TEK) used for encrypting traffic data for a group traffic service is called a group TEK (GTEK), and a lifetime of the GTEK and a lifetime of a group key encryption key (GKEK) used to encrypt the GTEK are set to be different from each other. The group traffic service corresponds to one of a multicast service, a broadcast service, and multicast broadcast service (MBS). Particularly, the lifetime of the GKEK is set to be greater than that of the GTEK. That is, an updating cycle of the GKEK is set to be greater than that of the GTEK. For example, the GKEK lifetime corresponds to n*GTEK lifetime in the following embodiment to be described with reference to FIG. 1 (n is a natural number that is greater than 1). That is, the GKEK is updated once while the GTEK is updated n times.

Figure 1:
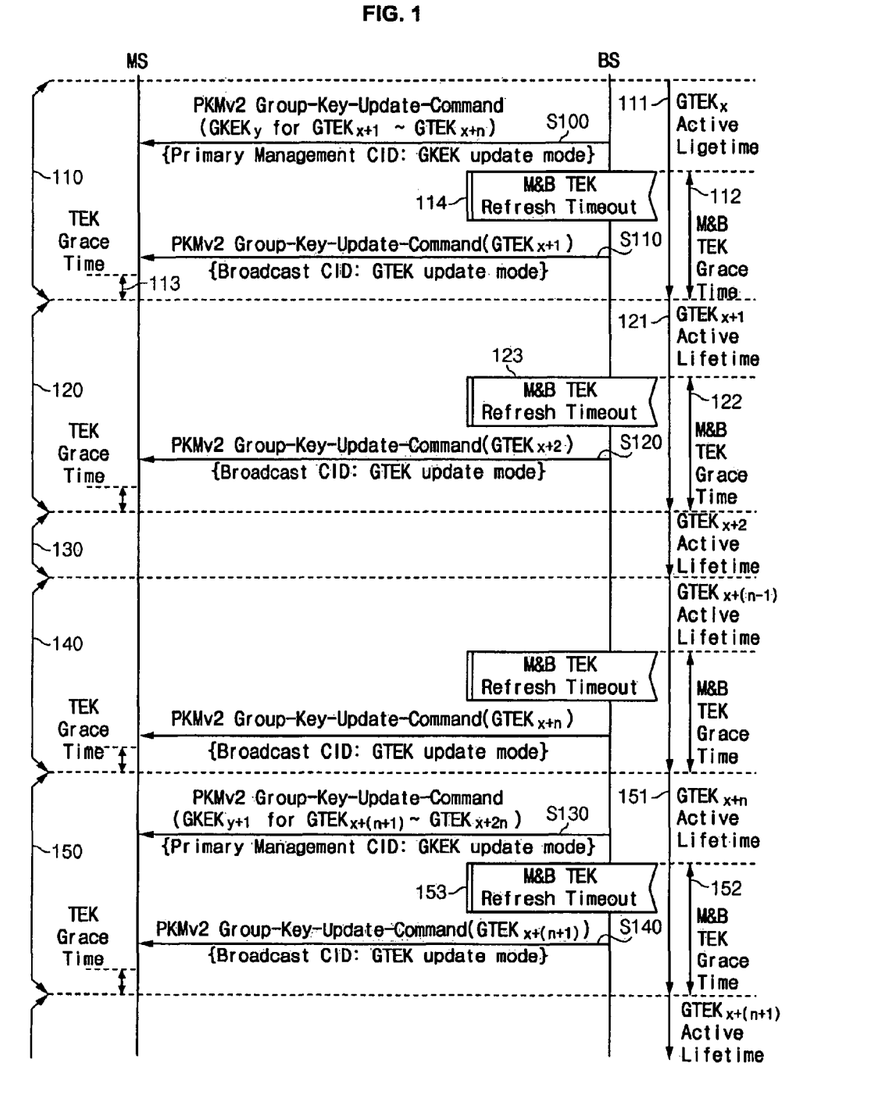
FIG. 1 is a flowchart of a process for updating a group traffic encryption key for group traffic service security in a wireless portable Internet system according to an exemplary embodiment of the present invention.

FIG. 1 is a flowchart of a process for updating a GTEK in a wireless portable Internet system according to an exemplary embodiment of the present invention.

Herein, assume that the subscriber station and the base station already share a valid GTEK through an initial GTEK generation and distribution process. Particularly, assume that the subscriber station and the base station already share the x-th GTEK ($GTEK_x$) through a plurality of GTEK update processes. The GTEK ($GTEK_x$) at this point is called a current GTEK. In addition, assume that a lifetime of the $GTEK_x$ expires at the same time when a lifetime of the same GKEK used for encrypting the respective $GTEK_{x-(n-1)}$ to $GTEK_x$ expires. The GKEK at this point is called a current GKEK.

In order to provide a secure and seamless group traffic service to the subscriber station before the lifetime of the current GTEK expires, the base station must update the GTEK for the group traffic service. However, since the subscriber station and the base station already share the x-th GTEK ($GTEK_x$), the base station must perform a process 110 for generating and distributing the (x+1)-th GTEK ($GTEK_{x+1}$) to the subscriber station. The $GTEK_{x+1}$ at this point is called a next GTEK.

Accordingly, the process for generating and distributing the (x+1)-th GTEK ($GTEK_{x+1}$) must be performed within an active lifetime 111 of the x-th GTEK ($GTEK_x$). In other words, the (x+1)-th GTEK ($GTEK_{x+1}$) must be generated and distributed before the lifetime of the x-th GTEK ($GTEK_x$) expires.

The base station manages a TEK Grace Time for multicast service, broadcast service, or MBS. That is, the base station manages an M&B TEK Grace Time 112. The M&B TEK Grace Time is a time interval before expiration of an active lifetime 111 of a GTEK (e.g., the x-th GTEK ($GTEK_x$) in the present embodiment). A value of the M&B TEK Grace Time is specified by service provider policy.

In addition, the subscriber station manages a TEK Grace Time 113. The TEK Grace Time 113 is a time interval before expiration of the active lifetime 111 of the x-th GTEK ($GTEK_x$). However, the M&B TEK Grace Time 112 managed in the base station is longer than the TEK Grace Time 113 managed in the subscriber station, and therefore the M&B TEK Grace time 112 starts earlier than the TEK Grace Time 113.

Thus, the base station transmits the first PKMv2 Group-Key-Update-Command message to the corresponding subscriber stations served with the service for updating the GKEK before the M&B TEK Grace Time 112 starts, in step S100. The first PKMv2 Group-Key-Update-Command message is carried on a primary management connection identifier (CID), which is a unique connection identifier (CID) assigned to each subscriber station by the base station. That is, the first PKMv2 Group-Key-Update-Command message is transmitted to all subscriber stations served with the specific service.

The first PKMv2 Group-Key-Update-Command message is transmitted by the base station to transmit the GKEK to the subscriber station. At this time, the GKEK is the y-th GKEK ($GKEK_y$) used for encryption of all GTEKs ($GTEK_{x+1}$, $GTEK_{x+2}$, ..., $GTEK_{x+(n-1)}$, and $GTEK_{x+n}$) to be updated n times. Therefore, the first PKMv2 Group-Key-Update-Command message is called a PKMv2 Group-Key-Update-Command message for the GKEK update mode. In addition, the GKEK is encrypted with a KEK derived from an authorization key (AK) of the subscriber station and transmitted to the subscriber station.

Accordingly, the base station transmits the PKMv2 Group-Key-Update-Command message for the GTEK update mode to the respective subscriber stations served with the service before the M&B TEK Grace Time 112 starts so as to update the y-th GKEK $GKEK_y$ to be used for encrypting GTEKs ($GTEK_{x+1}$, $GTEK_{x+2}$, ..., $GTEK_{x+(n-1)}$, and $GTEK_{x+n}$) during n GTEK lifecycles.

When the M&B TEK Grace Time 112 managed in the base station starts, an event 114, called an M&B Refresh Timeout, is triggered by a TEK state machine managed in the base station.

When the M&B TEK Refresh Timeout 114 is triggered, the base station transmits the second PKMv2 Group-Key-Update-Command message to the corresponding subscriber stations served with the service, in step S110. The base station broadcasts the second PKMv2 Group-Key-Update-Command message to all the subscriber stations through a broadcast CID.

The second PKMv2 Group-Key-Update-Command message includes a GTEK (i.e., the (x+1)-th GTEK ($GTEK_{x+1}$) in the present embodiment) to be used for traffic data encryption during the next time interval. Therefore, the second PKMv2 Group-Key-Update-Command message is called a PKMv2 Group-Key-Update-Command message for the GTEK update mode.

As described, the base station broadcasts the PKMv2 Group-Key-Update-Command message for the GTEK mode to all the subscriber stations right after the M&B Grace Time 112 starts so as to transmit the (x+1)-th GTEK ($GTEK_{x+1}$) to be used to encrypt traffic data for the service during the next time interval.

Herein, since the PKMv2 Group-Key-Update-Command message for the GTEK update mode is broadcasted by the base station, both an authorized subscriber station and an unauthorized subscriber station receive this message. However, the (x+1)-th GTEK ($GTEK_{x+1}$) included in the PKMv2 Group-Key-Update-Command message for the GTEK update mode only can be decrypted by a subscriber station that has successfully received the first message including the y-th GKEK ($GKEK_y$), that is, the PKMv2 Group-Key-Update-Command message for the GKEK update mode. This is because the (x+1)-th GTEK ($GTEK_{x+1}$) has been encrypted with the y-th GKEK ($GKEK_y$) included in the PKMv2 Group-Key-Update-Command message for the GKEK update mode.

Accordingly, the process for generation and distribution of a valid GTEK for the next time interval is completed, and subscriber stations having successfully received the GTEK can be continuously served with the specific service in the next time interval.

When the active lifetime 111 of the x-th GTEK ($GTEK_x$) 111 expires, a lifetime 121 of the (x+1)-th GTEK ($GTEK_{x+1}$) is started.

Then, the base station performs a process 120 for generating and distributing the (x+2)-th GTEK ($GTEK_{x+2}$) to the subscriber station served with the service. The (x+2)-th GTEK ($GTEK_{x+2}$) is generated and distributed during the active lifetime 121 of the (x+1)-th GTEK ($GTEK_{x+1}$).

The (x+2)-th GTEK ($GTEK_{x+2}$) generation and distribution process 120 is not the same as the process 110 for generating and distributing the (x+1)-th GTEK ($GTEK_{x+1}$). The y-th GKEK ($GKEK_y$) used for encrypting the (x+2)-th GTEK ($GTEK_{x+2}$) is a current GKEK that is already shared by the subscriber station served with the service and the base station. Therefore, when updating the (x+2)-th GTEK ($GTEK_{x+2}$), the key used for encrypting the (x+2)-th GTEK ($GTEK_{x+2}$) doesn't need to be updated.

In other words, the first message (i.e., the PKMv2 Group-Key-Update-Command message for the GKEK update mode) that has been used during the updating process of the (x+1)-th GTEK ($GTEK_{x+1}$) is not used when updating the (x+2)-th GTEK ($GTEK_{x+2}$). This is because the GKEK used for encrypting the (x+2)-th GTEK ($GTEK_{x+2}$) has already been shared by the subscriber station and the base station through the PKMv2 Group-Key-Update-Command message for the GKEK update mode during the process 110 for updating the (x+1)-th GTEK ($GTEK_{x+1}$).

When the M&B TEK Grace Time 122 managed in the base station is started, an M&B TEK Refresh Timeout 123 event is triggered and the base station broadcasts the PKMv2 Group-Key-Update-Command message for the GTEK mode to update the (x+2)-th GTEK ($GTEK_{x+2}$), in step S120.

Accordingly, a process for generation and distribution of a valid GTEK for the next time interval is completed, and subscriber stations that have successfully received the GTEK can be continuously served with the same service in the next time interval.

As described, the base station broadcasts only the PKMv2 Group-Key-Update-Command message for the GTEK update mode to subscriber stations that want to be served with the service during the next GTEK lifecycles, that is, from the third lifetime to the n-th lifetime in step S120 so that the GTEKs ($GTEK_{x+3}, \ldots, GTEK_{x+(n-1)}, GTEK_{x+n}$) can be periodically updated through processes 130, 140, and 150.

Herein, since the GKEK active lifetime corresponds to the n times of the GTEK active lifetime, the current GKEK (y-th GKEK ($GKEK_y$) in the present embodiment) is used for encrypting n GTEKs ($GTEK_{x+1}, GTEK_{x+2}, \ldots, GTEK_{x+(n-1)},$ and $GTEK_{x+n}$) in the case that the current GKEK is shared.

However, in order to encrypt the (x+n+1)-th GTEK ($GTEK_{x+n+1}$) to the (x+2n)-th GTEK ($GTEK_{x+2n}$), not the y-th GKEK ($GKEK_y$) but the (y+1)-th GKEK ($GKEK_{y+1}$) is required. Therefore, the base station must perform a process 150 for generating and updating the (y+1)-th GKEK ($GKEK_{y+1}$) and the (x+n+1)-th GTEK ($GTEK_{x+n+1}$) during the active lifetime 151 of the (x+n)-th GTEK ($GTEK_{x+n}$).

This can be achieved by determination of the base station on whether the lifetime of the y-th GKEK ($GKEK_y$) expires within the active lifetime 151 of the (x+n)-th GTEK ($GTEK_{x+n}$). In the case that the lifetime of the y-th GKEK ($GKEK_y$) expires within the active lifetime 151 of the (x+n)-th GTEK ($GTEK_{x+n}$), both the (y+1)-th GKEK ($GKEK_{y+1}$) and the (x+n+1)-th GTEK ($GTEK_{x+n+1}$) must be updated within the active lifetime 151 of the (x+n)-th GTEK ($GTEK_{x+n}$).

However, in the case that the lifetime of the y-th GKEK ($GKEK_y$) does not expire within the active lifetime 151 of the (x+n)-th GTEK ($GTEK_{x+n}$), only the (x+n+1)-th GTEK ($GTEK_{x+n+1}$) is generated and updated. The lifetime of the y-th GKEK ($GKEK_y$) corresponds to an n*GTEK lifetime, and, more particularly, the lifetime 151 of the (x+n)-th GTEK ($GTEK_{x+n}$) and the lifetime of the (y+1)-th GKEK ($GKEK_{y+1}$) expire simultaneously. Therefore, both the (y+1)-th GKEK ($GKEK_{y+1}$) and the (x+n+1)-th GTEK ($GTEK_{x+n+1}$) must be updated within the lifetime 151 of the (x+n)-th GTEK ($GTEK_{x+n}$). At this time, the (y+1)-th GKEK ($GKEK_{y+1}$) is called a next GKEK.

The process 150 for generating and updating the (x+n+1)-th GTEK ($GTEK_{x+n+1}$) and the process 110 for generating and updating the (x+1)-th GTEK ($GTEK_{x+1}$) are the same. That is, the base station individually transmits the PKMv2 Group-Key-Update-Command message for the GKEK update mode to the respective subscriber stations served with the service in step S130 so as to generate and update the (y+1)-th GKEK ($GKEK_{y+1}$) before the M&B TEK Grace Time 152 is started. When the M&B TEK Grace Time 152 is started, M&B TEK Refresh Timeout 153 is generated by the TEK state machine managed in the base station and thus the base station broadcasts the PKMv2 Group-Key-Update-Command message for the GTEK update mode to all the subscriber stations in step S140. At this time, the message includes the (x+n+1)-th GTEK ($GTEK_{x+n+1}$).

Accordingly, the subscriber station that has successfully received the (x+n+1)-th GTEK ($GTEK_{x+n+1}$) can be continuously served with the service during the next time interval.

Particularly, the (y+1)-th GKEK ($GKEK_{y+1}$) included in the PKMv2 Group-Key-Update-Command message for the GKEK update mode (S130) is used for encrypting GTEKs (i.e., $GTEK_{x+n+1}, GTEK_{x+n+2}, \ldots, GTEK_{x+(2n-1)},$ and $GTEK_{x+2n}$) to be updated during the next continuing lifetimes. Therefore, a detailed description of a process for updating the (x+n+2)-th GTEK ($GTEK_{x+n+2}$) to the (x+2n)-th GTEK ($GTEK_{x+2n}$) will not be further provided since it is the same as the process 120 for updating the (x+2)-th GTEK ($GTEK_{x+2}$).

As described, according to the method for updating a GTEK for a multicast service, a broadcast service, or an MBS in the exemplary embodiment of the present invention, the base station encrypts the GTEK with the GKEK so as to provide seamless and secure services to the subscriber station and also to securely transmit a periodically updated GTEK. At this time, the lifetime of the GKEK is extended relatively longer than that of the GTEK in order to extend a GKEK updating cycle.

Therefore, while improving security for the service by reducing the GTEK updating cycle, the number of transmissions of the PKMv2 Group-Key-Update-Command message for the GKEK update mode can be reduced by increasing the GKEK updating cycle such that resource consumption in the radio channel can be reduced.

Since it was assumed that the subscriber station and the base station already shared a valid GTEK through the GTEK generation and distribution process in the previous description of the exemplary embodiment, the following description will be related to a process in which the base station initially generates a GTEK for a specific group traffic service, distributes the GTEK to a subscriber station served with the service, and shares the GTEK with the subscriber station. The process can be used for an initial GTEK generation and distribution request of a subscriber station when a base station initially serves a specific group traffic service for a multicast service, a broadcast service, or an MBS to the subscriber station.

Figure 2:
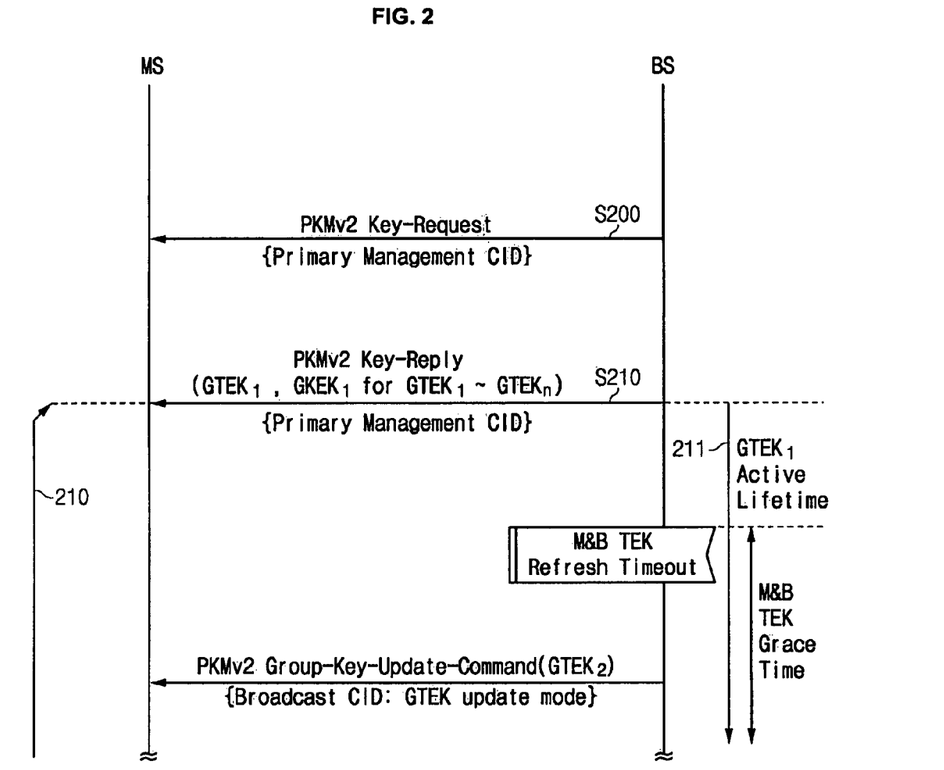
FIG. 2 is a flowchart of a process for initially generating and distributing a group traffic encryption key in the wireless portable Internet system according to the exemplary embodiment of the present invention.

FIG. 2 is a flowchart of a GTEK generation and distribution process initially performed by a subscriber station that wants to be served with a group traffic service in the wireless portable Internet system according to the exemplary embodiment of the present invention.

When the subscriber station is successfully authorized before an initial request for GTEK generation and distribution, the base station provides group traffic services to the authorized subscriber station. In order to avoid a service interruption caused by a malicious attacker, the GTEK generation and distribution process is performed between the base station and the subscriber station such that only an authorized subscriber station can be served with the service.

Referring to FIG. 2, the subscriber station transmits a PKMv2 Key-Request message to the base station in order to request a GTEK corresponding to a group traffic service with which the subscriber station wants to be served, in step S200. At this time, the PKMv2 Key-Request message is carried on a primary management CID that is uniquely assigned by the base station.

Upon an arrival of the PKMv2 Key-Request message, the base station first performs message authentication. When the message is successfully authenticated and the base station determines to distribute a GTEK that corresponds to the service with which the subscriber station wants to be served, the base station transmits a PKMv2 Key-Reply message to the subscriber station in step S210. At this time, the PKMv2 Key-Reply message includes a GTEK for encrypting group traffic data associated with the service. The GTEK included in the message is initially generated by the base station for encryption of the corresponding group traffic service, and therefore it will be called the first GTEK ($GTEK_1$).

The PKMv2 Key-Reply message also includes the first GKEK ($GKEK_1$) that has been initially generated by the base station for the encryption of the first GTEK ($GTEK_1$). Herein, as previously described with reference to FIG. 1, the first GKEK ($GKEK_1$) is used for encrypting GTEKs ($GTEK_1$, $GTEK_2$, ..., $GTEK_{n-1}$, and $GTEK_n$) to be generated and updated n times. This implies that a lifetime of one GKEK is set longer such that it is enough for encrypting n GTEKs. The PKMv2 Key-Reply message is also carried on the primary management CID uniquely assigned by the base station.

Accordingly, an active lifetime 211 of the first GKEK ($GKEK_1$) starts as the subscriber station receives the PKMv2 Key-Reply message in which the first GKEK ($GKEK_1$) is included, and the base station and the subscriber station use the first GKEK ($GKEK_1$) for decrypting the GTEKs ($GTEK_1$, $GTEK_2$, ..., $GTEK_{n-1}$, $GTEK_n$) to be periodically updated for the service by using the first GKEK ($GKEK_1$) during the lifetime 211.

An active lifetime of the second GTEK ($GTEK_2$) begins when an active lifetime 211 of the first GTEK ($GTEK_1$) ends. The base station performs a process 210 for generating and distributing the second GTEK ($GTEK_2$) to the subscriber station served with the service. The process 210 must be performed within the active lifetime 211 of the first GTEK ($GTEK_1$).

The process 210 for generating and distributing the second GTEK ($GTEK_2$) is the same as the previously described processes 120, 130, and 140 for generating and distributing the (x+2)-th GTEK ($GTEK_{x+2}$) to the (x+n)-th GTEK ($GTEK_{x+n}$) in FIG. 1, and therefore a detailed description thereof will be omitted.

Since the first GKEK ($GKEK_1$) used for encrypting the second GTEK ($GTEK_2$) to the n-th GTEK ($GTEK_n$) is shared by the base station and the subscriber station served with the service, as previously described with reference to FIG. 1, an additional key updating process for a key to be used for encrypting the second GTEK ($GTEK_2$) to the n-th GTEK ($GTEK_n$) isn't needed when performing the process for updating the second GTEK ($GTEK_2$) to the n-th GTEK ($GTEK_n$).

Therefore, as previously stated, when the base-station supports encryption for a group traffic service, the GTEK updating cycle is reduced for higher security of the service but the GKEK updating cycle is increased to reduce the number of transmissions of the PKMv2 Group-Key-Update-Command message for the GKEK update mode so that resource consumption in the radio channel can be reduced.

It was illustrated in FIG. 2 that the subscriber station and the base station initially generate and distribute a GTEK for a group traffic service. However, a random subscriber station may request a specific group traffic service that has already being served to a plurality of subscriber stations from a base station and thus the GTEK (a current GTEK) already shared by the base station and the plurality of subscriber stations is distributed to the random subscriber station. A process for distributing the current GTEK to the random subscriber station is similar to the process illustrated in FIG. 2, except for a few differences.

The following description will be related to the differences. In addition, the above process can also be applied to a GTEK or GKEK update and distribution requested from a subscriber station in the case that the subscriber station could not successfully receive a GTEK or GKEK that is newly updated during the process of FIG. 1 for updating and distributing a GTEK (next GTEK) or GKEK that is valid in the next time interval.

Since the subscriber station requests the group traffic service that has been currently served, the base station provides the subscriber station with a remaining lifetime rather than the original lifetime of the current GTEK as a lifetime of the current GTEK, and also provides a remaining lifetime of a current GKEK used for encrypting the current GTEK rather than the original lifetime of the GKEK as a lifetime of the current GKEK when providing a GTEK to the subscriber station.

Therefore, the corresponding subscriber station starts the lifetime of the current GTEK after receiving the PKMv2 Key-Reply message including the current GTEK.

For example, referring to FIG. 2, in the case that the subscriber station requests a group traffic service and receives a current GTEK when the (n–5)-th GTEK ($GTEK_{n-5}$) is already used for the service and a current GKEK used for encrypting the (n–5)-th GETK ($GTEK_{n-5}$) is the first GKEK ($GKEK1$) used for encrypting the first GTEK ($GTEK_1$) to the n-th GTEK ($GTEK_n$), the subscriber station is provided with the (n–5)-th GTEK ($GTEK_{n-5}$) as a current GTEK and the first GKEK ($GKEK_1$) as a current GKEK from the base station and the base station performs a GTEK updating process five times for updating the (n–4)-th GTEK ($GTEK_{n-4}$) to the n-th GTEK ($GTEK_n$), respectively.

Then the base station transmits the PKMv2 Group-Key-Update-Command message for the GKEK update mode in order to update the second GKEK ($GKEK_2$) before the lifetime of, the n-th GTEK ($GTEK_n$) expires. In addition, the base station transmits the PKMv2 Group-Key-Update-Command message for the GTEK update mode in order to update the (n+1)-th GTEK ($GTEK_{n+1}$) before the lifetime of the n-th GTEK ($GTEK_n$) expires.

Therefore, while more than one subscriber station is already served with a specific group traffic service from a base station, another subscriber station may request the specific service. In this instance, security for the service is increased by reducing an updating cycle of the GTEK, and an updating cycle of the GKEK is extended relatively longer than the updating cycle of the GTEK and thus the number of transmissions of the PKMv2 Group-key-Update-Command message for the GKEK update mode is reduced such that resource consumption in the radio channel can be reduced.

Figure 3:
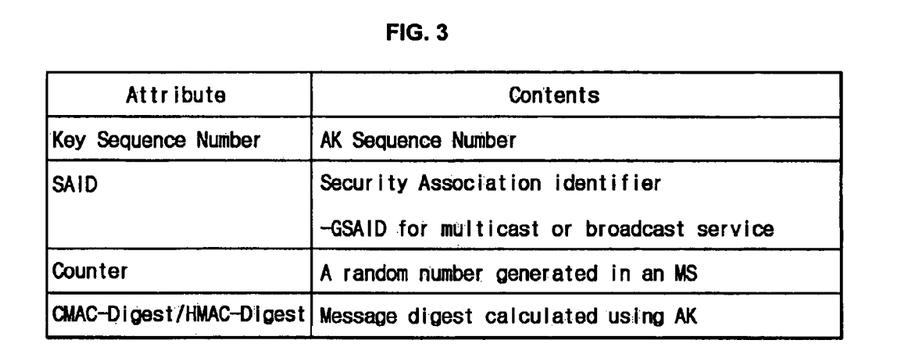
FIG. 3 is a table of parameters of a PKMv2 Key-Request message used in the group traffic encryption key generation and distribution process in the wireless portable Internet system according to the exemplary embodiment of the present invention.

FIG. 3 is a table showing parameters of the PKMv2 Key-Request message used for GTEK generation and distribution in the wireless portable Internet system according to an exemplary embodiment of the present invention.

As shown in FIG. 2, in the case that the subscriber station requests a GTEK in order to receive one group traffic service of a multicast service, a broadcast service, or a multicast-broadcast service (MBS), the subscriber station transmits the PKMv2 Key-Request message to the base station. When the subscriber station does not receive a GTEK that is valid in the next time interval from the base station within the TEK Grace Time managed in the subscriber station and thus requests a new GTEK, the subscriber station also transmits the PKMv2 Key-Request message to the base station.

Referring to FIG. 3, the PKMv2 Key-Request message includes a key sequence number, a security association identifier (SAID), a counter, and a CMAC/HMAC-Digest.

The key sequence number is a sequence number of a synchronized authorization key (AK) between a subscriber station and a base station. A key used for generating the CMAC-Digest or HMAC-Digest included in the PKMv2 Key-Request message is derived from an AK. Since there may be two synchronized AKs between the base station and the subscriber station, the key sequence number is used to distinguish the two AKs. That is, the key sequence number is used to distinguish which AK among the two AKs is used for generating the CMAC-Digest or HMAC-Digest.

The SAID is a security association (SA) identifier. The SA is a set containing a GTEK and parameters for traffic data encryption. In the present embodiment, an SAID for a multicast service or a broadcast service is called a group SAID (GSAID). The multicast service, broadcast service, and MBS respectively have different characteristics in encryption and therefore different GTEKs are used for the respective services. In other words, each service is assigned a different GSAID.

The counter is used to protect against a replay attack of the PKMv2 Key-Request message. The subscriber, station and the base station independently manage the counter. The subscriber station increases a value of the counter by 1 whenever the subscriber station transmits the PKMv2 Key-Request message. When receiving the PKMv2 Key-Request message from the subscriber station, the base station checks a value of the counter included in the message. In the case that the value of the counter included in the PKMv2 Key-Request message is less than or equal to a previous value of the counter, the base station determines that a replay attack has occurred and discards the received message.

The CMAC-Digest or HMAC-Digest is a parameter used for PKMv2 Key-Request message authentication. The subscriber station generates the CMAC-Digest or HMAC-Digest by using an AK for other parameters of the PKMv2 Key-Request message, excluding the CMAC-Digest and HMAC-Digest parameters.

Figure 4:
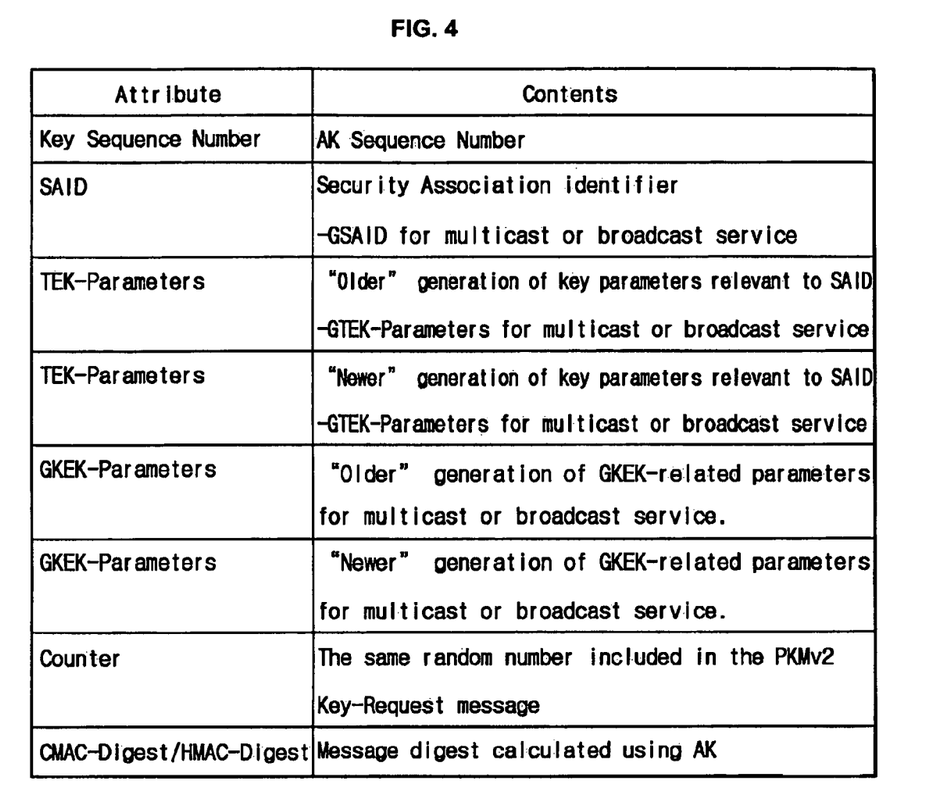
FIG. 4 is a table of parameters of a PKMv2 Key-Reply message used in the group traffic encryption key generation and distribution process in the wireless portable Internet system according to the exemplary embodiment of the present invention.

FIG. 4 is a table showing parameters of the PKMv2 Key-Reply message used for GTEK generation and distribution in the wireless portable. Internet system according to the embodiment of the present invention.

When receiving the PKMv2 Key-Request message from the subscriber station, the base station authenticates the message by using the CMAC-Digest or HMAC-Digest included in the message. When the message authentication has succeeded and a GTEK is generated, the base station transmits a PKMv2 Key-Reply message including the GTEK to the subscriber station.

The PKMv2 Key-Reply message includes a key sequence number, an SAID, TEK-related parameters (TEK-Parameters), GKEK-related parameters (GTEK-Parameters), a counter, and a CMAC-Digest or HMAC-Digest.

A description for the key sequence number and the SAID will not be further provided since it is the same as those included in the PKMv2 Key-Request message of FIG. 3.

The TEK-Parameters contain parameters for traffic data encryption. In the present embodiment, the TEK-Parameters are parameters for a multicast service, a broadcast service, or an MBS, and therefore the TEK-parameters can be understood as GTEK-related parameters (GTEK-Parameters).

The GTEK-Parameters included in the PKMv2 Key-Reply message may include a parameter (Older parameter) to be used for the current lifetime interval and a parameter (Newer parameter) to be used for the next lifetime interval.

As previously stated with reference to FIG. 1, the base station responds to the PKMv2 Key-Request message with the PKMv2 key-Reply message including Older generation of GTEK-related parameters to be used for the current lifetime interval when the base station receives the PKMv2 Key-Request message before the M&B TEK Grace Times 112, 122, and 152 that generate the M&B TEK Refresh Timeout start. In the case that the base station receives the PKMv2 Key-Request message after the M&B TEK Grace Times 112, 122, and 152 start, the base station responds to the PKMv2 Key-Request message with the PKMv2 Key-Reply message with inclusion of both Older generation of GTEK-related parameters to be used for the current lifetime interval and Newer generation of GTEK-related parameters to be used for the next lifetime interval.

The GKEK-related parameters can be included in the PKMv2 Key-Reply message only in the case of defining an SA corresponding to the multicast service, broadcast service, or MBS.

The GKEK-Parameters included in the PKMv2 Key-Reply message may include a parameter (Older parameter) to be used for the current lifetime interval and a parameter (Newer parameter) to be used for the next lifetime interval.

Referring to FIG. 1, when the base station receives the PKMv2 Key-Request message before the M&B TEK Grace Times 112, 122, and 152 that trigger the M&B TEK Refresh Timeout event, the base station includes only Older generation of the GTEK-related parameters to be used for the current lifetime interval in the PKMv2 Key-Reply message and transmits the message to the subscriber station in response to the PKMv2 Key-Request message.

However, when the base station receives the PKMv2 Key-Request message for updating the GKEK within an active lifetime of the current GTEK after the M&B TEK Grace Time 112, 122, and 152 are started, the base station includes both Older generation of GKEK-related parameters for the current lifetime interval and Newer generation of GKEK-related parameters for the next lifetime interval in the PKMv2 Key-Reply message and transmits the message to the subscriber station in response to the PKMv2 Key-Request message.

In the case that the base station receives the PKMv2 Key-Reply message and the base station has not yet performed the processes 120, 130, and 140 for updating a GKEK during the active lifetime of the current GTEK after the M&B TEK Grace Times 112, 122, and 152, the base station includes GKEK-related parameters to be used for the current lifetime in the PKMv2 Key-Reply message and transmits the message to the subscriber station in response to the PKMv2 Key-Request message.

The counter is used for protecting a replay attack of the PKMv2 Key-Reply message. The subscriber station and the base station independently manage the counter. The base station increases a value of the counter by 1 whenever transmitting the PKMv2 Key-Reply message. Therefore, when receiving the PKMv2 Key-Reply message from the base station, the subscriber station checks a value of the counter included in the message. In the case that the value of the counter included in the PKMv2 Key-Reply message is less than or equal to a previous value of the counter, the subscriber station regards that a replay attack has occurred and discards the received message.

The CMAC-Digest or HMAC-Digest is a parameter used for PKMv2 Key-Reply message authentication. The base station generates a CMAC-Digest or HMAC-Digest by using an AK for other parameters of the PKMv2 Key-Reply message, excluding the CMAC-Digest or HMAC-Digest.

Figure 5:
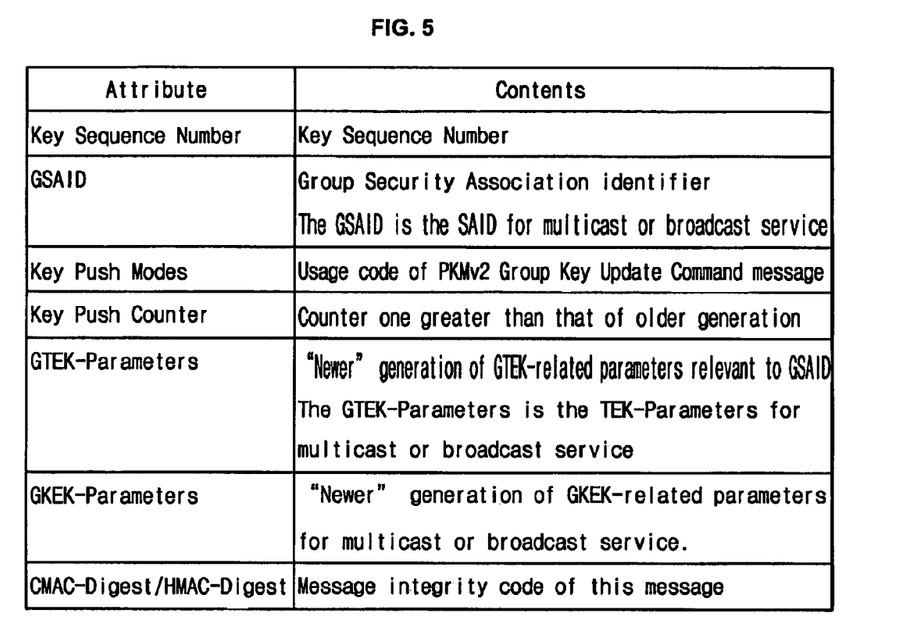
FIG. 5 is a table of parameters of a PKMv2 Group-Key-Update-Command message used in the group traffic encryption key generation and distribution process in the wireless portable Internet system according to the exemplary embodiment of the present invention.

FIG. 5 is a table showing parameters of the PKMv2 Group-Key-Update-Command message used for a GTEK updating process in the wireless portable Internet system according to the exemplary embodiment of the present invention.

A base station transmits the PKMv2 Key-Update-Command message to subscriber stations served with a specific group traffic service in order to continuously update a GTEK for the service within a lifetime of a current GTEK before the base station receives the PKMv2 Key-Request message for the GTEK updating request from the subscriber stations.

Referring to FIG. 1, the base station transmits the PKMv2 Group-Key-Update-Command message for the GKEK update mode to the respective subscriber stations served with the service before the lifetime of the GKEK expires in steps S100 and S130. In addition, the base station broadcasts the PKMv2 Group-Key-Update-Command message for the GTEK update mode before the lifetime of the GTEK expires in steps S110, S120, and S140.

The PKMv2 Group-Key-Update-Command message includes a Key Sequence Number, a GSAID, a Key Push Modes, a Key Push Counter, GTEK-related parameters (GTEK-Parameters), G KEK-related parameters (GKEK-Parameters), and a CMAC-Digest or HMAC-Digest.

The Key Sequence Number is a sequence number of a key. The Key Sequence Number included in the PKMv2 Group-Key-Update-Command message for the GKEK update mode is a sequence number of an AK, and the Key Sequence Number included in the PKMv2 Group-Key-Update-Command message for the GTEK update mode is a sequence number of a GKEK.

A key used for generating the CMAC-Digest or HMAC-Digest included in the PKMv2 Group-Key-Update-Command message for the GKEK update mode is derived from an AK. Since the base station and the subscriber station may have two AKs at the same time, the key sequence number is used to distinguish the two AKs. That is, the key sequence number is used to distinguish which AK among the two AKs is used for generating the CMAC-Digest or HMAC-Digest included in the PKMv2 Group-Key-Update-Command message for the GKEK update mode.

However, a key used for generating the CMAC-Digest or HMAC-Digest included in the PKMv2 Group-Key-Update-Command message for the GTEK update mode is derived from the GKEK. Since the base station and the subscriber station may simultaneously have two GKEKs, the PKMv2 Group-Key-Update-Command message includes a GKEK sequence number to distinguish the two GKEKs. In other words, the GKEK sequence number is used to distinguish which GKEK among the two GKEKs is used for generating the CMAC-Digest or HMAC-Digest included in the PKMv2 Group-Key-Update-Command message for the GTEK update mode.

The GSAID is an identifier of the SA. The GSAID identifies SA mapping to a service that corresponds to a GTEK or GKEK to be updated by the base station. The GSAID is an SAID for such a group traffic service.

The Key Push Modes is a code for distinguishing a mode of the PKMv2 Group-Key-Update-Command message. That is, Key Push Modes identifies whether the PKMv2 Group-Key-Update-Command message is for the GKEK update or for the GTEK update mode.

The Key Push Counter is used to protect against a replay attack of the PKMv2 Group-Key-Update-Command message. The subscriber station and the base station independently manage the counters. The base station increases a value of the Key Push Counter by 1 whenever transmitting the PKMv2 Group-Key-Update-Command message. Therefore, when receiving the PKMv2 Group-Key-Update-Command message from the base station, the subscriber station checks a value of the counter included in the message. In the case that the value of the Key Push Counter included in the PKMv2 Key-Reply message is less than or equal to a previous value of the counter, the subscriber station determines that a replay attack has occurred and discards the received message.

The GTEK-related parameter (GTEK-Parameters) contains parameters for traffic data encryption. The GTEK-Parameter is a GTEK-related parameter (Newer parameter) to be used for the next lifetime interval. A GTEK generated by the base station and distributed through the PKMv2 Group-Key-Update-Command message for the GTEK update mode is provided to subscriber stations that are already being served with the group traffic service because the subscriber stations have already known the Older generation of the GTEK-Parameters to be used for the current lifetime interval.

The GKEK-related parameter (GKEK-Parameters) contains parameters for GTEK encryption. The GKEK-Parameter is a GKEK-related parameter (Newer parameter) to be used for the next time interval. A GKEK generated by the base station and distributed through the PKMv2 Group-Key-Update-Command message for the GKEK update mode is provided to subscriber stations that are already being served with the group traffic service because the subscriber stations have already known the Older generation of the GKEK-Parameters to be used for the current lifetime interval.

The CMAC-Digest or HMAC-Digest is a parameter used for PKMv2 Group-Key-Update-Command message authentication. The base station generates the CMAC-Digest or HMAC-Digest by using an AK for other parameters of the PKMv2 Group-Key-Update-Command message, excluding the CMAC-Digest or HMAC-Digest.

Figure 6:
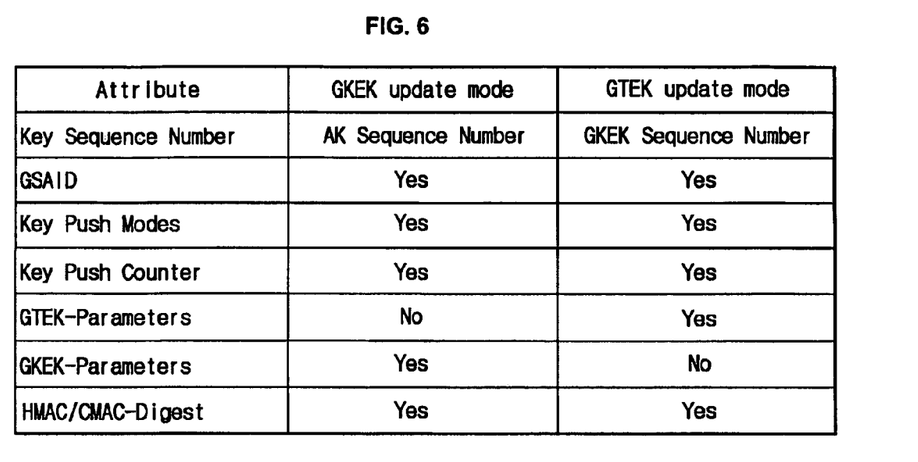
FIG. 6 is a table showing usages of parameters of the PKMv2 Group-Key-Update-Command message according to value of the Key Push Modes of FIG. 5.

FIG. 6 is a table showing usages of parameters of the PKMv2 Group-Key-Update-Command message according to the value of the Key Push Modes field of FIG. 5.

According to the exemplary embodiment of the present invention, there are two types in the PKMv2 Group-Key-Update-Command message, i.e., a GKEK update mode and a GTEK update mode. The Key Push Modes field included in the PKMv2 Group-Key-Update-Command message is used to distinguish the two modes.

In the case that the Key Push Modes represents the GKEK update mode, the PKMv2 Group-Key-Update-Command message includes an AK sequence number, a GSAID, a Key Push Modes, a Key Push Counter, a GKEK-related parameters, and a CMAC-Digest or HMAC-Digest.

The base station and the subscriber station share the GKEK sequence number through the GKEK-related parameters included in the PKMv2 Group-Key-Update-Command message for the GKEK update mode.

In the case that the Key Push Modes represents the GTEK update mode, the PKMv2 Group-Key-Update-Command message includes a GKEK sequence number, a GSAID, a Key Push Modes, a Key Push Counter, a GTEK-related parameters, and a CMAC-Digest or HMAC-Digest.

Figure 7:
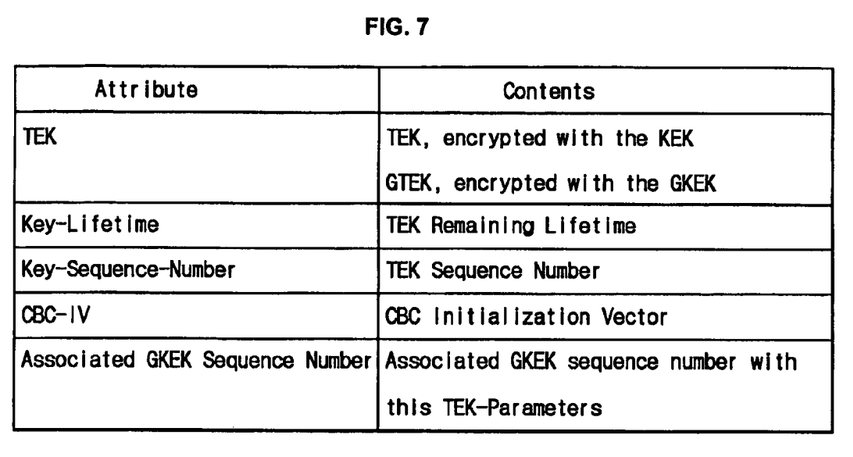
FIG. 7 is a table showing contents of fields included in the GTEK-parameters of FIG. 4 and FIG. 5.

FIG. 7 is a table showing contents of fields include in the GTEK-Parameters of FIG. 4 and FIG. 5.

The GTEK-Parameters field is included in the PKMv2 Group-Key-Update-Command message for the GTEK update mode or in the PKMv2 Key-Reply message used in the GTEK generation and distribution process shown in FIG. 2. The subscriber station and the base station share the GTEK and GTEK-related information through the GTEK-Parameters field.

Referring to FIG. 7, the GTEK-Parameters include TEK, Key-Lifetime, Key-Sequence-Number, Cipher Block Chaining (CBC)-Initialization Vector (IV), and Associated GKEK Sequence Number.

The TEK as key used for encrypting traffic data is used in the same way as the GTEK for a multicast service, a broadcast service, or an MBS in the exemplary embodiment of the present invention. The GTEK is encrypted with a unique GKEK for each service and is transmitted from the base station to the subscriber station. That is, only a subscriber station that has the GKEK can decrypt the encrypted GTEK.

Key-Lifetime corresponds to a remaining lifetime of the GTEK. The base station must update a new GTEK before the lifetime of the current GTEK expires.

The Key-Sequence-Number is a sequence number of a GTEK. The base station and the subscriber station share two GTEKs when the GTEK is being updated, and therefore the GTEK sequence number is used to distinguish the two GTEKs.

The CBC-IV is input data for generating an IV when a CBC mode encryption algorithm is used for encrypting the GTEK.

The Associated GKEK Sequence Number is used for notifying which GKEK is used for encrypting the GTEK included in the GTEK-Parameters. That is, since the subscriber station and the base station synchronously have two GTEKs at the moment of GTEK update, the Associated GKEK sequence number is used for informing which GKEK among the two GKEKs is used to encrypt a GTEK that is currently being transmitted.

Figure 8:
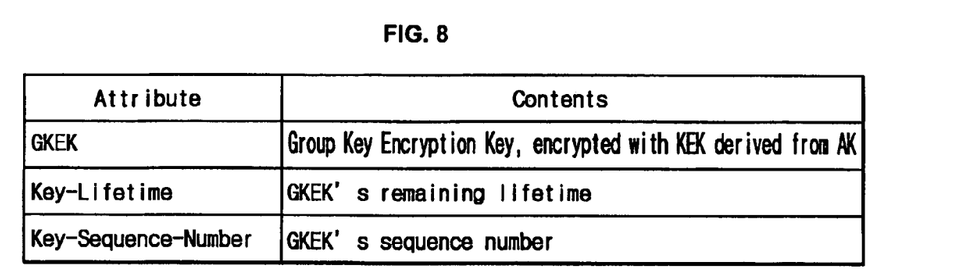
FIG. 8 is a table showing contents of fields in the GKEK-parameters of FIG. 4 and FIG. 5.

FIG. 8 is a table showing contents of fields included in the GKEK-Parameters in FIG. 4 and FIG. 5.

The PKMv2 Group-Key-Update-Command message for the GKEK update mode or the PKMv2 Key-Reply message in the initial GTEK generation and distribution process of FIG. 2 includes the GKEK-Parameters. The subscriber station and the base station share GKEK-related information through the GKEK-Parameters.

Referring to FIG. 8, the GKEK-Parameter includes a GKEK, a Key-Lifetime, and a Key-Sequence-Number.

The GKEK is used for encrypting a GTEK for a multicast service, a broadcast service, or an MBS. The GKEK is generated uniquely for each service by a base station or a random network server (e.g., authentication server or MBS server). In addition, the GKEK is encrypted with a KEK derived from a unique AK shared with each subscriber station served with a group traffic service and transmitted to each subscriber station. That is, only a subscriber station having a KEK derived from a valid AK can decrypt the GKEK.

The Key-Lifetime corresponds to a remaining lifetime of the GKEK. The base station must update a new GKEK before the lifetime of the current GKEK expires. In addition, according to the exemplary embodiment of the present invention, the lifetime of the GKEK is set to be greater than that of the GTEK. It was assumed that the GKEK lifetime corresponds to n*GTEK lifetime in the exemplary embodiment. In the case that a group traffic service that is currently being served is requested and thus the corresponding GTEK and GKEK are assigned, a lifetime of the GKEK corresponds to a remaining lifetime of the current GKEK in the corresponding time interval. Therefore, the lifetime of the GKEK may correspond to a lifetime of the GTEK.

The Key-Sequence-Number is a sequence number of a GKEK. The base station and the subscriber station share two GKEKs when the GTEK is being updated, and therefore, the GKEK sequence number is used to distinguish the two GKEKs.

Although it was described in the exemplary embodiment of the present invention that the lifetime of the GKEK corresponds to n times the lifetime of the GTEK (n is an integer). However, in the case that the GKEK lifetime is longer than the GTEK lifetime and does not correspond to n times of the GTEK lifetime, a plurality of GTEKs can be updated within the lifetime of the GKEK according to another exemplary embodiment of the present invention, and accordingly, radio resource consumption can be reduced. With reference to the above-described exemplary embodiment of the present invention, this example can be easily understood by those skilled in the art.

In addition, according to the exemplary embodiment of the present invention, the GTEK is generated and distributed by the base station as shown in FIG. 1 and FIG. 2. However, a random network node, for example a group traffic server, a node which requests authentication (Authenticator), or an MBS server may also generate and distribute the GTEK and GKEK. The GTEK and GKEK generated by the random network node are transmitted to a base station connected to the network node and then distributed to subscriber stations served with the group traffic service through a radio channel. The GTEK and GKEK generated by the random network node can be transmitted to the base station by employing various methods.

The following description is related to two methods among the various methods. First, the random network node periodically generates a GTEK and a GKEK and periodically transmits the GTEK and GKEK to the base station providing the group traffic service to subscriber stations. Second, the random network node periodically generates a GTEK and a GKEK, and when a base station providing the group traffic service to subscriber stations requests the GTEK or GKEK, the random network node transmits the GTEK and GKEK to the base station in response to the request. Therefore, the base station manages the GTEK and GKEK transmitted from the random network node by using the above-stated methods. The base station efficiently distributes the GTEK and GKEK to subscriber stations served with the group traffic service with reference to the processes of FIG. 1 and FIG. 2. Therefore, with reference to FIG. 1 and FIG. 2 and the descriptions of the drawings, it can be easily understood that the present invention may also applied when the random network node generates and distributes the GTEK and GKEK.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

Advantageous Effects

The present invention provides the following advantageous effects.

First, a GTEK for multicast service, broadcast service, or MBS can be efficiently managed by independently managing the GKEK updating cycle and the GTEK updating cycle.

Second, the lifetime GTEK lifetime can be reduced and the GKEK lifetime can be increased by setting the GKEK lifetime to be greater than the GTEK lifetime to thereby increase security for the service while reducing radio resource consumption.

The invention claimed is:

1. A method for updating a group traffic encryption key (GTEK) for a group traffic service in a wireless portable Internet system, the method comprising:
   a) determining, at a base station, whether a lifetime of a current group key encryption key (GKEK) used for encrypting a current GTEK expires within a lifetime of the current GTEK;
   b) when the lifetime of the current GKEK does expire within the lifetime of the current GTEK, generating, at the base station, a next GTEK and a next GKEK to be used for encrypting the next GTEK within the lifetime of the current GTEK and transmitting the next GTEK and the next GKEK to a subscriber station; and
   c) when the lifetime of the current GKEK does not expire within the lifetime of the current GTEK, generating, at the base station, a next GTEK within the lifetime of the current GTEK and transmitting the next GTEK to the subscriber station, wherein the next GTEK is encrypted by using the current GKEK.

2. The method of claim 1, wherein b) comprises:
   i) generating the next GKEK during a time interval between the start of the lifetime of the current GTEK and a specific update time;
   ii) individually transmitting the next GKEK to subscriber stations served with the group traffic service through a dedicated channel between the subscriber station and a base station;
   iii) generating the next GTEK after the specific update time has expired and encrypting the next GTEK by using the next GKEK; and
   iv) transmitting the encrypted next GTEK to all subscriber stations through a broadcasting channel between the subscriber station and the base station.

3. The method of claim 2, wherein the base station sets a lifetime of a GKEK used for encrypting a GTEK to be longer than a lifetime of the GTEK.

4. The method of claim 2, wherein the specific update time is set based on a multicast and broadcast (M&B) traffic encryption key (TEK) Grace Time managed in the base station, and corresponds to a time prior to expiration of the current GTEK lifetime by the amount of the M&B TEK Grace Time.

5. The method of claim 1, wherein c) comprises:
   i) generating the next GTEK after a specific update time has passed from the start of the lifetime of the current GTEK; and
   ii) transmitting the next GTEK to all subscriber stations through a broadcasting channel between the subscriber station and the base station.

6. The method of claim 1, wherein a group key update message for a GKEK update mode used for transmitting the next GKEK generated in b) to each subscriber station served with the group traffic service, a group key update message for a GTEK update mode used for transmitting the next GTEK generated in b) to all subscriber stations, and a group key update message for the GTEK update mode used for transmitting the next GTEK generated in c) to all the subscriber stations are privacy key management version 2 (PKMv2) Group-Key-Update-Command messages in the same format.

7. The method of claim 6, wherein the group key update message for the GKEK update mode comprises:
   an authorization key (AK) sequence number for identifying an AK used for generating a Cipher-based Message Authentication Code Digest (CMAC-Digest) or Hash-based Message Authentication Code Digest (HMAC-Digest); and
   a GKEK-related parameter for transmitting parameters related to a GKEK that is valid in the next GKEK lifetime.

8. The method of claim 7, wherein the group key update message further comprises:
   a group security association identity (GSAID) for identifying security association (SA) mapping to a group traffic service;
   a key push mode for distinguishing whether the message is the group key update message for the GKEK update mode or is the group key update message for the GTEK update mode;
   a key push counter for protecting the message from a replay attack of a malicious attacker; and
   a CMAC-Digest or HMAC-Digest for performing a message authentication function.

9. The method of claim 7, wherein the GKEK-related parameter comprises:
   a GKEK used for encrypting a GTEK, that is encrypted with a KEK derived from an AK uniquely assigned to each subscriber station, and is transmitted to each subscriber station served with the group traffic service;
   a GKEK lifetime for informing of a remaining lifetime of the GKEK; and
   a GKEK sequence number for distinguishing between two GKEKs that exist during a GKEK update.

10. The method of claim 6, wherein the group key update message for the GTEK update mode comprises:
    a GKEK sequence number for identifying a GKEK used for generating a Cipher-based Message Authentication Code Digest (CMAC-Digest) or Hash-based Message Authentication Code Digest (HMAC-Digest); and
    a GTEK-related parameter for transmitting parameters related to a GTEK that is valid in the next GTEK lifetime.

11. The method of claim 10, wherein the GTEK-related parameter comprises:
    a GTEK for encrypting traffic data for a group traffic service, and that is encrypted with a GKEK uniquely assigned to each group traffic service and transmitted to the all subscriber stations;
    a GTEK lifetime for informing of a remaining lifetime of the GTEK;
    a GKEK sequence number for distinguishing between two GKEKs that exist during a GTEK update; and
    an associated GKEK sequence number for identifying that which GKEK among the two GKEKs is used for encrypting the respective two GTEKs that exist during a GTEK update, and that is mapped to the corresponding GKEK sequence number.

12. The method of claim 1, wherein when a network node generates a GTEK and a GKEK, the network node transmits the GTEK and GKEK to a base station for distribution of the GTEK and GKEK to subscriber stations, wherein the base station accesses the network node and provides the group traffic service to a plurality of subscriber stations through a radio channel, wherein the network node corresponds to a group traffic server, a node which requests authentication, or a multicast broadcast service (MBS) server.

13. The method of claim 12, wherein the network node periodically generates a GTEK and a GKEK and periodically transmits the GTEK and the GKEK to the base station.

14. The method of claim 12, wherein the network node periodically generates a GTEK and a GKEK, and when the base station requests the GTEK or GKEK, the network node transmits the GTEK and GKEK to the base station in response to the request.

15. A method for a base station to update a group traffic encryption key (GTEK) for a group traffic service in a wireless portable Internet system, the method comprising:

a) receiving, at the base station, a GTEK request through a key request message for encrypting a specific group traffic service from a subscriber station;

b) determining, at the base station, whether a GTEK being used for the specific group traffic service exists;

c) when a result of the determination shows that the GTEK being used for encrypting the specific group traffic service does not exist, generating, at the base station, an initial GTEK for encrypting traffic data of the specific group traffic service and an initial group key encryption key (GKEK) for encrypting the initial GTEK, and transmitting the initial GTEK and the initial GKEK to the subscriber station; and d) when a result of the determination shows that the GTEK being used for encrypting the specific group traffic service exists, transmitting, at the base station, a key reply message including the currently used GTEK and the currently used GKEK for encrypting the current GTEK to the subscriber station, wherein a lifetime of the initial GKEK generated in c) is set greater than that of the initial GTEK, and a lifetime of the GTEK transmitted to the subscriber station in d) and a lifetime of the GKEK respectively correspond to a remaining lifetime of each key.

16. The method of claim 15, wherein the key reply message used for transmitting the GTEK and the GKEK to the subscriber station comprises:

a current GTEK-related parameter that includes parameters related to a GTEK to be used for a lifetime of a current GTEK;

a next GTEK-related parameter that includes parameters related to a GTEK to be used for a lifetime of the next GTEK;

a current GKEK-related parameter that includes parameters related to a GKEK to be used for a lifetime of a current GKEK; and a next GKEK-related parameter that includes parameters related to a GKEK to be used for a lifetime of the next GKEK.

17. The method of claim 16, wherein, when a subscriber station requests the GTEK before a specific update time passes since the start of a lifetime of the GTEK, wherein the subscriber station requests the specific group traffic service so to be served with the service for the first time, the base station transmits a key reply message including the current GTEK-related parameter and the current GKEK-related parameter to the subscriber station.

18. The method of claim 16, wherein, when a subscriber station requests the GTEK after a specific update time has passed since the start of a lifetime of the GTEK, and a lifetime of the current GKEK expires within a lifetime of the current GTEK, wherein the subscriber station requests the specific group traffic service so as to be served with the service for the first time, the base station transmits a key reply message including the current GTEK-related parameter, the current GKEK-related parameter, the next GTEK-related parameter, and the next GKEK-related parameter to the subscriber station.

19. The method of claim 16, wherein, when a subscriber station requests the GTEK after a specific update time has passed since the start of a lifetime of the GTEK, and a lifetime of the current GKEK does not expire within a lifetime of the current GTEK, wherein the subscriber station requests the specific group traffic service so as to be served with the service for the first time, the base station transmits a key reply message including the current GTEK-related parameter, the current GKEK-related parameter, and the next GTEK-related parameter to the subscriber station.

20. The method of claim 16, wherein when a subscriber station requests the GTEK after a specific update time has passed since the start of a lifetime of the GTEK, and a lifetime of the current GKEK expires within a lifetime of the current GTEK, wherein the subscriber station has already been served with the specific group traffic service, the base station transmits a key reply message including the next GTEK-related parameter, and the next GKEK-related parameter to the subscriber station.

21. The method of claim 16, wherein when a subscriber station requests the GTEK after a specific update time has passed since the start of a lifetime of the GTEK, and a lifetime of the current GKEK does not expire within a lifetime of the current GTEK, wherein the subscriber station has already been served with the group specific traffic service, the base station transmits a key reply message including the next GTEK-related parameter to the subscriber station.

* * * * *